Figure 4:
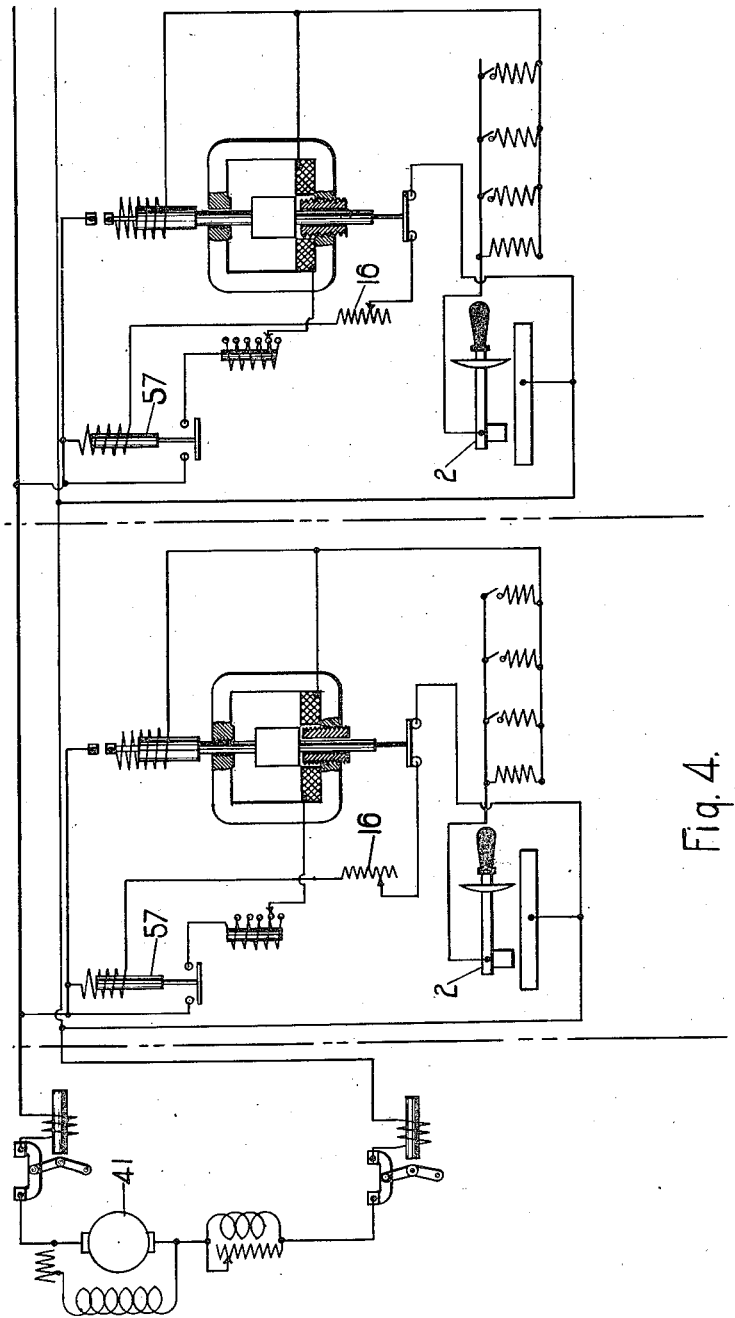

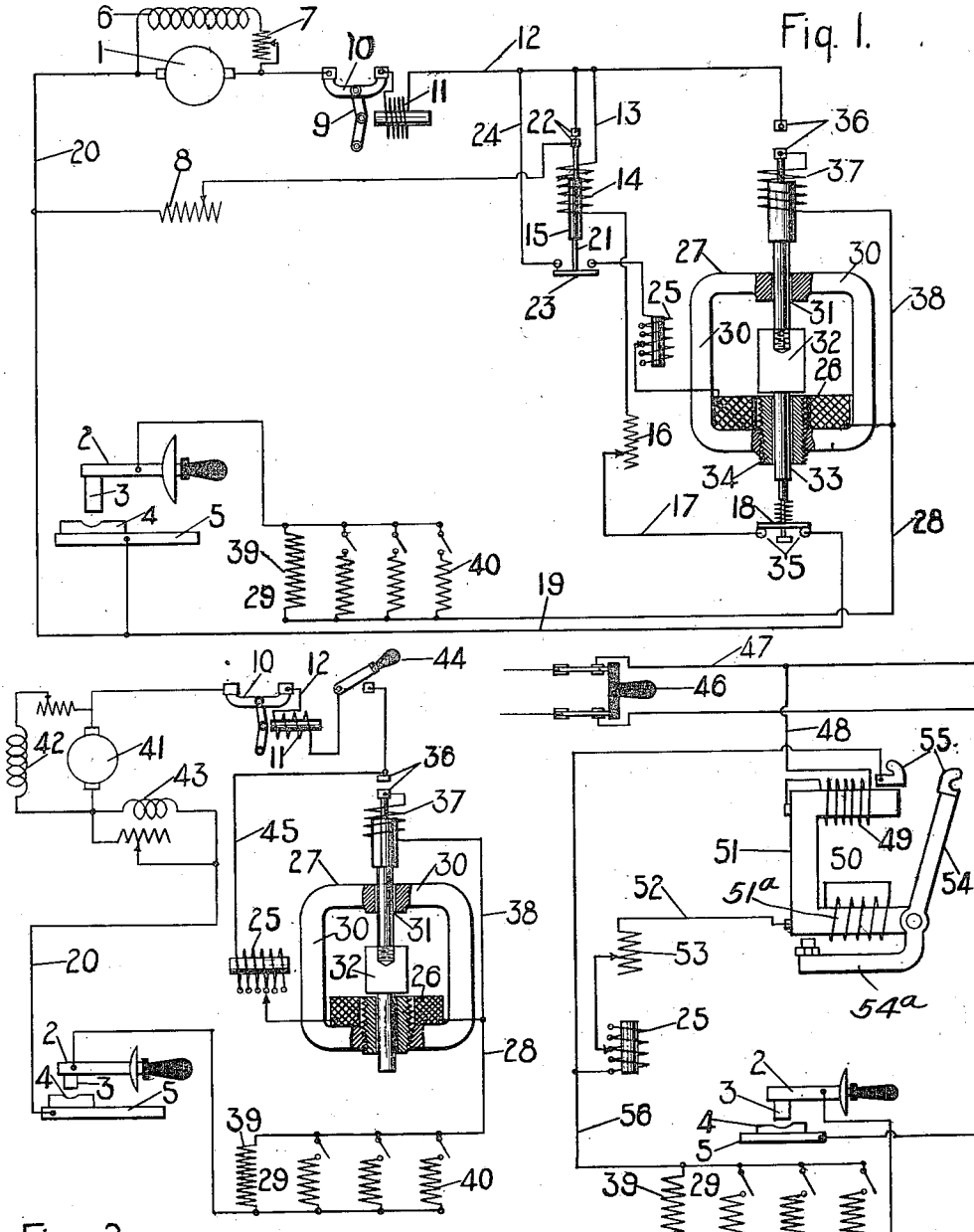

E. S. ZUCK.
ELECTRIC WELDING SYSTEM.
APPLICATION FILED OCT. 3, 1913.

1,296,350.

Patented Mar. 4, 1919.
2 SHEETS—SHEET 2.

WITNESSES:
INVENTOR
BY
ATTORNEY

UNITED STATES PATENT OFFICE.

EMERSON S. ZUCK, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC WELDING SYSTEM.

1,296,350.  Specification of Letters Patent.  Patented Mar. 4, 1919.

Application filed October 3, 1913. Serial No. 793,125.

*To all whom it may concern:*

Be it known that I, EMERSON S. ZUCK, a citizen of the United States, and a resident of Wilkinsburg, in the county of Allegheny and State of Pennsylvania, have invented a new and useful Improvement in Electric Welding Systems, of which the following is a specification.

My invention relates to electric welding, and it has special reference to certain new and useful improvements in control circuits which supply the welding current to the apparatus, tools or work to be operated upon.

In control systems which heretofore have been associated with electric welding systems, it was essential that a load resistor be placed in circuit to furnish the desired load for the generator during the momentary interruptions of the welding operations. The necessity of having this load resistor results from the large amount of current required during the starting operation, which would reduce the voltage on the supply line, by reason of armature reaction, and from the current surges which would result if the load resistor were not in circuit during the interruptions of the welding arc. As a consequence of the above-mentioned arrangement, the generator is always maintained under full-load conditions regardless of the time during which the welding tools are inoperative.

One object of my invention is to provide, in an electric welding system, a novel means for starting the welding arc and for switching the welding tools to the main supply circuit when the arc has been established.

A further object of my invention is to provide a control system for electric welding by means of which the operation of starting the welding arc may be effected without appreciably loading the generator.

Another object of my invention is to provide an electric welding system which does not maintain the generator at all times under full-load operating conditions and which will assist in performing satisfactory work.

A still further object of my invention is to provide an electric welding system which will be economical to operate and will permit the simultaneous use of a plurality of welding tools, the operation of which will not interfere with one another.

Other novel features of my invention will be apparent from the following description and drawings, and will be particularly pointed out in the appended claims.

Of the drawings, Figure 1 is a diagrammatic view, partially in section, of a control system for electric welding, which embodies a form of my invention; Fig. 2 is a modification of the system shown in Fig. 1, in which modification the load resistor is preferably eliminated; Fig. 3 represents, diagrammatically, a control system embodying a form of my invention, and Fig. 4 is a diagrammatic view of my control system wherein is shown a plurality of welding tools which may be simultaneously and satisfactorily operated.

Referring to Fig. 1, a direct current generator 1 supplies electric current to an electrode or welding tool 2 which comprises a conducting pencil 3 made either of metal or of carbon. The work piece 4 which is to be operated upon by the said welding tool, is positioned upon a metallic table 5 which is electrically connected to the generator 1, thereby completing the main operating or welding circuit. The work piece 4 and the table 5, in combination, thus form the electrode which coöperates with the conducting pencil 3 to sustain the welding arc. The generator 1 is shown as a shunt wound generator, a shunt field winding 6 being connected in series with an adjustable resistor 7 by means of which the value of the electromotive force of the generator may be controlled. It is not essential that the generator 1 be of the shunt-wound type, as will hereinafter be explained, but, when using a load resistor 8 for maintaining a load upon the generator 1 during the interruptions of the welding arc, a shunt-wound generator may be used. This is preferable to a compound-wound generator in combination with a load resistor because the first cost of furnishing the same is appreciably lower.

When a circuit breaker 9 is closed, current will flow from the generator 1 through a bridging member 10, a winding 11 of the trip coil of the said breaker, conductors 12 and 13, a magnetizing winding 14 of a switch 15 and an adjustable resistance winding 16, a conductor 17, a bridging member 18 and conductors 19 and 20 to the negative side of the generator 1. The resistance offered by the windings 14 and 16 to the flow of current therethrough limits the said current to a value sufficient only to operate the magnet switch 15.

As the plunger 21 of the magnet switch 15 is actuated, coöperatively engaged contacts 22 close a circuit through the load resistor 8, the resistance of which is adjusted to insure a certain load being placed upon the generator 1 so that its voltage will be maintained constant when the welding circuit is connected thereto.

Simultaneously with the engagement of the two contacts 22, a bridging member 23 which is secured to the plunger 21, is advanced upwardly, and, as the operator brings the pencil 3 in electrical contact with the work piece 4, current will flow from the conductor 12, through a conductor 24, the bridging member 23, an inductive winding 25, a winding 26 of a cut-out switch 27, a conductor 28, a steadying resistor 29, the tool 2, the work piece 4, and the table 5, to the generator 1. The resistance of the above circuit is so adjusted that the current flowing through the same is not excessive, but the said circuit is highly inductive by reason of the reactance offered by the winding 25 and the winding 26. The purpose of inserting the highly inductive windings 25 and 26 in this circuit is to enable the operator to draw an arc between the pencil 3 and the work piece 4 when he raises the tool 2, preliminary to performing the welding operation. The action of this circuit, as the operator initially draws the welding arc between the said coöperating electrodes, is similar to the breaking of a circuit comprising the shunt field winding of an ordinary dynamo, whereby the inductive discharge thus occasioned is sufficient to generate an arc of considerable length. As shown in the drawing, the inductive winding 25 is adjustable, thereby permitting the operator to control the length of the arc during the starting operation.

It is well known that, after an arc has been once established, current will continue to flow across the same, providing the source of the current supply is uninterrupted and the arc is not ruptured by reason of its length being abnormally increased. As the welding tool 2 is withdrawn from the work piece 4, the current flowing across the welding arc which is thus lengthened, will decrease in amount until it reaches a predetermined value at which the cut-out switch 27 is designed to operate, thereby connecting the welding tool 2 in the main operating circuit.

In this figure, I have shown a well known form of a cut-out switch, the operation of which is as follows: The magnetic flux generated by the current in the winding 26, flows in a divided path through a magnetizable frame 30 from a pole face 31 thereof, across the air gap immediately below the said pole face and into a magnetizable core 32. At the lower end of the said core, the flux divides into two parts, one path being through a core extension 33 and a plug 34 to the lower end of the frame 30, and the other path being from the lower end of the core 32, across the air gap immediately below it, into the top of the plug 34 and thence to the frame 30. As the flux flows across the upper air gap, a force tends to raise the core 32, while the flux flowing across the lower air gap produces a force tending to prevent the core from being raised. If the amount of flux generated by the coil winding 26 is relatively low, the larger part of the said flux will flow through the core extension 33 and pass horizontally into the frame 30, thereby producing no tendency to prevent the plunger 32 from advancing upwardly. If the current flowing through the winding 26 is of such a value as to cause the generation of a large amount of magnetic flux, the restricted area in the portion of the magnetic circuit through the extension 33 forces flux to pass across the lower air gap into the top of the plug 34, thereby increasing the force tending to prevent the upward movement of the core 32.

When the operator initially draws the arc, the current flowing through the winding 26 is of a relatively high value, thereby preventing the core 32 of the cut-out switch from being actuated, as explained above. As the operator lengthens the welding arc, the current flowing in the hereinbefore mentioned starting circuit, is decreased to a predetermined value, at which value the core 32 is actuated, whereby the said starting circuit is broken by reason of the bridging member 18 being raised from its contact points 35. Simultaneously with the opening of the starting circuit by the actuation of the core 32, the main welding or operating circuit is closed by the coöperative engagement of contacts 36, thereby permitting the welding current to flow from the conductor 12, through the winding of a series holding-in coil 37, over conductors 38 and 28 and through the steadying resistance winding 29 to the welding tool 2.

When the starting circuit is opened by reason of the operation of the cut-out switch 27, the winding 14 is deënergized, thus opening the circuit through the inductive windings 25 and 26, and through the load resistor 8. The generator 1 now supplies current only to the main welding circuit which comprises a holding-in coil 37, the steadying resistor 29 and the welding arc extending between the pencil 3 and the work piece 4. The purpose of the holding-in coil 37 is to maintain the welding circuit closed for all values of current above a predetermined minimum value, below which it is desired to automatically open the said main welding circuit and to close the starting circuit by the downward movement of the core 32. When the starting circuit is thus reestablished, the energization of the winding 14 assists in closing the circuit comprising the load resistance 8, thereby maintaining a substantially constant load on the generator 1 irrespective of the amount of current supplied to the main welding circuit.

The steadying resistor 29 comprises a resistor 39 which is permanently connected in series with the welding tool 2, and a plurality of auxiliary resistors 40 by means of which the value of the current supplied to perform the welding operations may be regulated. The necessity of having a portion of the steadying resistor 29, such as the resistor 39, permanently connected in circuit is to make the welding arc more stable.

In Fig. 2, I have shown a view of a welding system, embodying a form of my invention, in which I prefer to use a compound-wound generator 41 comprising an adjustable shunt field winding 42 and an adjustable series field winding 43. In this modified form of my welding system, I may eliminate the load resistor, as it is unnecessary to maintain a substantially constant load upon the generator 41 irrespective of the interruptions of the welding operations. The generator 41 should be designed for either flat compounding or preferably slight over compounding, such as 2 per cent. which insures minimum fluctuations in the generator electromotive force as the welding circuit is intermittently connected to the said generator.

Referring more particularly to the circuits comprising the welding system shown in Fig. 2, at the closing of a switch 44, current will flow through the starting circuit providing the welding tool 2 is properly positioned relative to the work piece 4, the said starting circuit comprising a conductor 45, the adjustable inductive winding 25, the coil winding 26, the conductor 28, the steadying resistor 29, the welding tool 2, the conducting pencil 3, the work piece 4, the table 5, the conductor 20 and the generator 41. As the operator draws the welding arc, the current flowing through the coil winding 26 attains the predetermined value at which the cut-out switch 27 operates, thus shunting the starting circuit and connecting the generator to the main welding circuit.

As before mentioned, the starting circuit is highly inductive, so that, when the operator withdraws the welding tool 2 from the work piece 4, the "reactive kick" occasioned by opening this starting circuit is sufficient to draw a satisfactory arc. When the current flowing in the starting circuit decreases to the proper value by reason of the lengthening of the welding arc, the core 32 of the cut-out switch 27 is actuated, which throws the welding load upon the generator 41. The generator being a compound-wound machine of a particular design, picks up this welding load without any fluctuation or decrease in its voltage resulting therefrom.

Referring to Fig. 3, as the operator closes a knife switch 46, current will flow from a supply conductor 47, along a conductor 48, through a coil winding 49 of a series lockout switch 50, along a portion of the frame 51 of the said switch, over a conductor 52, through an adjustable resistance winding 53, the adjustable inductive winding 25, and the steadying resistor 29 to the welding tool 2. The inductive winding 25 is inserted in this starting circuit in order that the operator may draw a satisfactory welding arc between the welding tool 2 and the work piece 4, as explained in the systems previously described in this specification.

The series lock-out switch 50 is of a usual type of construction, and its operation is dependent upon the value of the current which flows through the coil winding 49 and upon the rate of change of the value of said current, which change is occasioned by the closing of the said circuit and by the withdrawal of the welding tool 2 from the work piece 4, thereby tending to break the starting circuit. The current flowing through the coil 49 sets up a magnetic flux in the frame 51, the magnetic circuit being completed through the pivoted arm 54. The lower leg of the frame 51 is adapted to be magnetically saturated at a predetermined current value, and when the current in the coil 49 exceeds this value, the additional flux so generated passes across the short air gap between the frame 51 and the end of an extension 54ª of the pivoted arm 54, and the arm 54 is thereby maintained in the position shown in Fig. 3, since the air gap just mentioned is much shorter than the air gap between the upper end of the arm 54 and the upper leg of the frame 51. The lower leg of the frame 51 is provided with a short-circuited damper winding 51ª, which serves to choke rapid variations in flux through this leg. When the current flowing in the winding 49 falls below the predetermined value, the flux through the arm 54ª decreases sufficiently to permit the arm 54 to be drawn toward the upper leg of the frame 51, whereby contact members 55 are brought into coöperative engagement. This automatic operation connects the welding tool into the main welding circuit which comprises the conductor 48, the coil winding 49, the conducting members 51 and 54 of the lockout switch, the contact members 55, a conductor 56, the steadying resistor 29 and the welding tool 2. It is apparent that the resistance winding 53 and the inductive winding 25 are now automatically shunted by the main welding circuit thus preventing the welding current from traversing through the said windings, which results in the efficient operation of the welding system.

Reference may now be had to Fig. 4, in which I have shown a compound wound generator 41 of large current capacity supplying energy to a plurality of welding tools 2, each tool being independently operated. I have not embodied any load resistance in this modification of my invention, inasmuch as the compound wound generator 41 is not subjected to voltage fluctuations by reason of the welding circuits being intermittently interrupted. I have shown magnet switches 57, for controlling the opening and closing of the starting circuits of each welding tool thereby permitting the operator to direct his undivided attention to the welding tool 2. As shown, the starting circuit associated with each welding tool comprises inductance by means of which the starting operation may be effected as hereinbefore mentioned. The operation of the circuits and devices comprising the welding tools are similar to those shown and described relative to Fig. 1, but it will be understood that any system embodying my invention may be associated with the welding tools 2, a plurality of which may be simultaneously supplied with current from the generator 41.

While I have herein shown and described several embodiments of my invention, it will be understood by anyone skilled in the art that various modifications may be effected without departing from the spirit of my invention.

I claim as my invention:

1. An electrical welding system comprising a source of current supply, an auxiliary circuit connected thereto for starting the welding arc, a main welding circuit, and means for automatically opening said auxiliary circuit when the current flowing therein reaches a predetermined value.

2. An electrical welding system comprising a source of current supply, an auxiliary circuit connected thereto and comprising an impedance device for starting the welding arc, a main operating circuit, and electro-responsive means for opening said auxiliary circuit and for closing the main operating circuit.

3. An electrical welding system comprising a source of current supply, an auxiliary circuit comprising an impedance device for starting the welding arc, a main operating circuit adapted to be connected to said source of current supply, electro-responsive means associated with the said auxiliary circuit whereby the main circuit may be closed, and means for maintaining the load upon the said source of current supply during temporary interruptions of the welding arc.

4. An electrical welding system comprising a source of current supply, a load resistance, an auxiliary circuit for starting the welding arc, a main operating circuit adapted to be connected to said source of current supply, electro-responsive means for closing the said main circuit when the current flowing in said auxiliary circuit reaches a predetermined value, and means for connecting the said load resistance to the source of current supply during temporary interruptions of the welding arc.

5. An electrical welding system comprising a source of current supply, an auxiliary circuit connected thereto for starting the welding arc, an inductive winding inserted in the auxiliary circuit and adapted to store a substantially large amount of electromagnetic energy, a main operating circuit, and means controlled by the current flowing in said auxiliary circuit whereby the said main operating circuit is closed.

6. An electrical welding system comprising a source of current supply, coöperating electrodes, an auxiliary circuit having connected therein an inductive winding for effecting a current discharge between the electrodes when withdrawn from one another, a main operating circuit, and means for connecting the said main operating circuit to the source of current supply when the current flowing in the said auxiliary circuit attains a predetermined value.

7. An electrical welding system comprising a source of current supply, an auxiliary circuit comprising a welding tool and an inductive winding by means of which a substantially large amount of electromagnetic energy may be stored in the said auxiliary circuit, a main operating circuit, and electro-responsive means for connecting the main operating circuit to the source of current supply.

8. An electrical welding system comprising a source of current supply, an auxiliary circuit in which is inserted an inductive winding for storing a substantially large amount of electromagnetic energy, a main operating circuit, and electro-responsive means controlled by the current flowing in the said auxiliary circuit for connecting the main operating circuit to the said source of current supply.

9. An electrical welding system comprising a source of current supply, a welding tool, an auxiliary circuit associated therewith, means inserted in said auxiliary circuit whereby a current discharge may be effected between said welding tool and the work piece, and a main operating circuit adapted to connect said welding tool and said source of current supply after the welding arc has been established.

10. An electrical welding system comprising a source of current supply, a welding tool, an auxiliary circuit associated therewith, an inductive winding inserted in the auxiliary circuit by means of which a substantially large amount of electromagnetic energy may be stored, and a main operating circuit adapted to connect said welding tool and said source of current supply after a current discharge from the said welding tool has been effected.

11. An electrical welding system comprising a source of current supply, electrodes between which a welding arc may be established, an auxiliary circuit comprising the said electrodes, and means inserted in said auxiliary circuit whereby a current discharge may be effected between the said electrodes only when initially drawing the welding arc.

12. An electrical welding system comprising a source of current supply, a welding tool adapted to coöperate with the work piece for maintaining a welding arc, an auxiliary circuit connected to said welding tool, and a storage means for electromagnetic energy whereby a current discharge is effected only when the said welding tool is withdrawn from the work piece.

13. An electrical welding system comprising a source of current supply adapted to maintain a substantially constant potential under all load conditions, and a plurality of welding tools to be independently operated, each tool having associated therewith an auxiliary circuit for starting the welding arc, and a main operating circuit for connecting the said welding tool to the source of current supply only after the welding arc has been established.

14. An electrical welding system comprising a source of current supply adapted to maintain a substantially constant potential under all load conditions, a plurality of independently operated welding tools adapted to be connected to said source of current supply, each tool having associated therewith an auxiliary circuit for starting the welding arc, a main operating circuit, and electro-responsive means controlled by the current flowing in said auxiliary circuit whereby the welding tool is inserted in its main operating circuit.

In testimony whereof, I have hereunto subscribed my name this 26th day of September 1913.

- EMERSON S. ZUCK.

Witnesses:
  L. B. Breed,
  B. B. Hines.